J. H. WARNER.
STUMP JUMP PLOW AND THE LIKE.
APPLICATION FILED NOV. 16, 1920.

1,381,040.

Patented June 7, 1921.

Inventor.
J. H. Warner.
by
Atty.

UNITED STATES PATENT OFFICE.

JOSEPH H. WARNER, OF NHILL, VICTORIA, AUSTRALIA.

STUMP-JUMP PLOW AND THE LIKE.

1,381,040. Specification of Letters Patent. Patented June 7, 1921.

Application filed November 16, 1920. Serial No. 424,549.

*To all whom it may concern:*

Be it known that I, JOSEPH HARVEY WARNER, farmer, a subject of the King of Great Britain and Ireland, and a resident of the post-town of Nhill, in the shire of Lowan, parish of Balrootan, in the county of Lowan, State of Victoria, Commonwealth of Australia, (whose post-office address is Nhill,) in the said shire of Lowan, have invented certain new and useful Improvements in Stump-Jump Plows and the like, of which the following is a specification.

This invention relates to stump jump plows and like agricultural implements such as stump jump scarifiers or cultivators, of the type wherein the shares are carried by pivoted jump arms or share carriers which are adapted to rise about their pivots and thus allow the shares to pass over stumps or obstructions, the share carriers being connected with the draft chains or connections in such manner that the tension of the draft tends to normally hold the shares down to their work and to return them to normal position after passing over an obstruction.

With such implements it frequently happens that a share or shares catch beneath a root or behind a stump in such a manner that the share cannot rise owing to the nature of the obstruction and the tension exerted by the draft on the share carrier tending to pull the share hard down against the obstruction. A sudden jerk and fracture or derangement of parts of the apparatus often results before the implement can be stopped and the share released from the obstruction.

The primary object of the present invention is to provide means whereby the share or share carrier is automatically released from the draft connections when a root or obstruction is caught upon as above mentioned and the share is prevented from rising. This release of the share from the draft tension permits it to ride freely over the obstruction after which the draft connections can again be attached to the share carrier. The arrangement is such that when the share strikes an ordinary obstruction such as does not catch and hold the share, the latter is permitted to rise and pass the obstruction in the usual manner and without releasing the share carrier from the draft connections as aforesaid. When, however, the share becomes caught and the pull exerted on it by the draft consequently becomes excessive the share is automatically released and permitted to rise as above mentioned.

Referring to the drawings which form part of this specification:—

Figure 1:
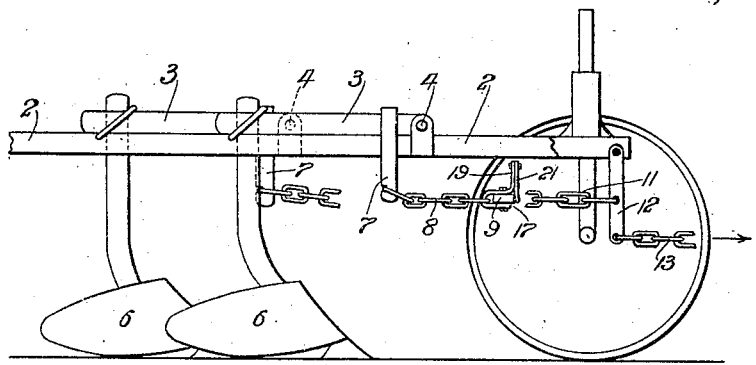
Figure 1 is a side elevation of portions of a stump jump plow showing one form of the invention applied thereto.
Figure 2:
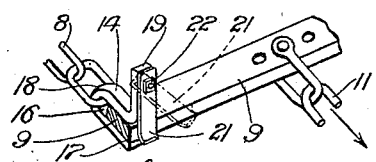
Fig. 2 is a perspective view on a larger scale of a share releasing device according to the embodiment shown in Fig. 1.
Figure 3:
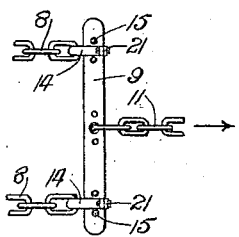
Fig. 3 is a plan of a swingletree and releasing devices in accordance with the embodiment shown in Figs. 1 and 2.
Figure 4:
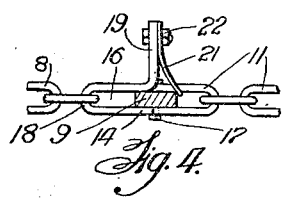
Fig. 4 shows the releasing device of Figs. 1, 2 and 3 in the act of releasing the share.

In all the figures the arrows indicate the direction of the draft or travel of the implement.

In the drawings the numeral 2 indicates the frame of a stump jump plow or the like to which the jump arms or share carriers 3 are pivoted by pivot pins 4, the shares 6 being mounted in the usual manner on the pivoted jump arms or share carriers 3.

Each share carrier has fixed thereto, the usual dropper or coupling member 7 to which the rear of the share control chains 8, connecting each of the share carriers with the swingletree or equalizer 9 are attached. Said swingletree is connected by a single chain or connection 11 with a draft lever 12 pivoted at 10 on the front of the implement frame 2. To this draft lever or other suitable draft attachment at the front of the implement the rear end of the draft chain 13, by which the implement is drawn forwardly, is attached.

It will thus be seen that the tension exerted on the draft connection 13 by the tractive force is transmitted to each of the pivoted share carriers so that should any one of the shares become caught beneath or behind a root or other obstruction so that the share cannot rise, the tension of the draft tends to hold the share hard down against the obstruction causing an abrupt stoppage of the implement and consequent liability to fracture or derangement of parts of the apparatus and injurious strain on the draft animals if such are employed. Should, however, this tension be removed from the share carriers, the respective share or shares would ride freely over the obstructions as the machine is drawn forwardly.

According to the invention a suitable releasing device is introduced to automatically disconnect one or all of the share carriers from the draft upon the share becoming caught and the strain on the draft consequently exceeding a certain limit, the share being thus permitted to ride freely over the obstruction.

As seen in the embodiment illustrated in Figs. 1 to 4 the releasing device comprises a yoke or coupling member 14 having a gullet or passage 16 therein to accommodate the swingletree 9. One of these yokes is attached to each of the chains or connections 8 connecting the share carriers with the swingletree, the gullet 16 being provided at one end with an open mouth indicated at 17, its other end being closed as at 18 for attachment to the respective chain 8 as aforesaid. The yokes 14 may be prevented from moving along the swingletree by stop pins 15 or other suitable means.

Each said yoke is also provided with an upright extension 19 to which a plate spring 21 is attached by a pivot pin or bolt 22 about which the spring 21 is adapted to be swung sidewardly to introduce the swingletree 9 into the gullet 16 without flexing the spring. The swingletree may thus be readily reinserted into the gullet after the releasing device has been operated to release the share and the obstruction has been passed. The spring 21 may advantageously comprise two or more laminations.

With the embodiment just described, it will be evident that by the lifting of the respective spring 21 when the tension on the draft connections becomes abnormal through the share catching on an obstruction, the share carrier or carriers connected to the respective chains 8 are adapted to be released from the swingletree independently of the other share carriers, the draft continuing to pull on the other shares which are unaffected by the obstruction and consequently remain in their normal position while the obstruction is being passed.

Figure 5:
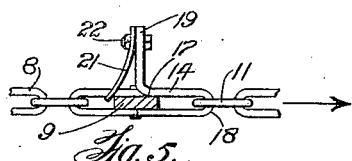
Fig. 5 is a view similar to Fig. 4 but showing the releasing device reversed.

As shown in Fig. 5, however, the chains 8 leading to the individual share carriers may be permanently secured to the swingletree and the rear end of the front chain 11 detachably connected thereto by reversing the releasing device so that when any one of the shares is caught by an obstruction and the tension on the draft consequently exceeds the strength of the spring 21 the latter will be flexed as in Fig. 5 to release the chain 11 from the swingletree. By this embodiment it will be evident that all the shares are simultaneously released and the implement will be drawn forwardly past the obstruction by the direct pull upon the implement frame the unobstructed shares remaining in their normal position while the obstructed share or shares ride freely over the obstruction.

Figure 6:
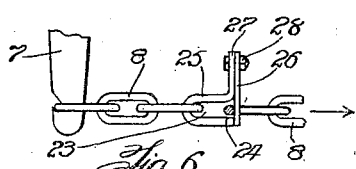
Figs. 6, 7 and 8 are side views of modified forms of the invention.

In the modification illustrated in Fig. 6 the releasing device is shown in the form of a chain divided into separable sections. Either of the chains 8 or 11 may constitute this element the two separable sections of the chain being united by a link or coupling member 25 having a gullet 23 therein to accommodate the adjacent end links of the two separable sections. This gullet is provided with an open mouth 24, which is normally closed by a plate spring 26 attached to an extension 27 of the member 25, preferably by a pivot pin or bolt 28 whereby the spring may be swung sidewardly as before mentioned or detached to connect the two sections of the chain after they have been separated to release the share by the lifting of the spring 26 when the tension of the chain exceeds a certain limit through the share catching on an obstruction as aforesaid.

Figure 7:
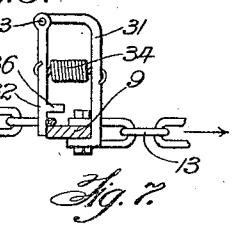

In the embodiment shown in Fig. 7 a bracket 31 is bolted or otherwise secured to the swingletree 9 and to this bracket a hinged arm or catch 32 is pivoted by a pivot pin 33. The catch 32 is normally held inward against the swingletree as shown by means of a tension spring 34 connected at one end to the catch and at its other end to the bracket. The catch 32 may be provided with a spur 36 to prevent the end of the chain 8 or 11 which is attached thereto from rising. When the share carrier becomes caught by an obstruction and the tension thereon consequently becomes excessive, the arm or catch 32 swings outwardly about its pivot 33 and releases the chain attached to the catch 32, from the swingletree consequently allowing the share to rise.

Figure 8:
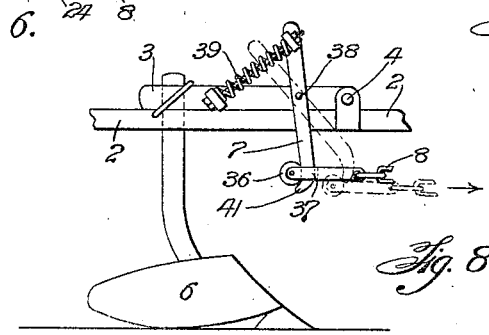

In certain types of stump jump plows the chains 8 are connected to the respective droppers or coupling members 7 through the intermediary of a roller 36 mounted in a forked or other suitable member 37 which is connected to the rear end of the chain 8. This roller is adapted to run along the rear face of the dropper 7 when the share rises on meeting an obstruction, a spur or stop being provided on the dropper to prevent the roller falling from the lower end thereof. In Fig. 8 the invention is shown applied to a share carrier of this type. According to this embodiment the dropper or coupling member 7 instead of being fixed to the jump arm or share carrier 3, is intermediately pivoted thereto as at 38 and the dropper is held in its normal position (shown in full lines) by a compression spring 39. The spur or stop 41 on the lower end of said dropper is so shaped as to prevent the roller 36 falling from the dropper when the latter is in its normal position, but is adapted to release the roller when the dropper or lever is drawn to the position shown in dotted lines in Fig. 8 through a share becoming caught and the draft tension consequently compressing the spring 39 to swing the dropper 7 about its pivot as indicated.

It will be evident from the foregoing that various devices may be employed in carrying out my invention and it is therefore intended and desired that the present description should be interpreted as illustrative of suitable embodiments rather than in a limiting sense. It will also be obvious that the term "chain" as used in this specification is intended to include other equivalent devices such as ropes or drawbars.

Having now described my invention what I claim as new and desire to secure by Letters Patent is:—

1. Improvements in stump jump plows and the like consisting in the combination with an implement frame having a pivoted jump arm or share carrier mounted thereon and connections for transmitting the draft tension to said share carrier, of means for automatically releasing the share carrier from the draft in the event of an abnormal draft tension thereon.

2. Improvements in stump jump plows and the like, consisting in the combination with an implement frame having a pivoted jump arm or share carrier mounted thereon, and a draft connection for transmitting the draft tension to said share carrier, of an element attached to the share carrier and a second element attached to the draft connection and normally united to the first element and a releasing device adapted to permit automatic separation of said two elements when the tension of the draft on the share carrier exceeds a certain limit, for the purpose set forth.

3. Improvements in stump jump plows consisting in the combination with an implement frame having a pivoted arm or share carrier mounted thereon and connections for transmitting the draft tension to said share carrier, of spring means for automatically releasing the share carrier from the draft tension upon the share catching an obstruction and the strain of the draft on the share carrier consequently becoming abnormal for the purpose set forth.

4. Improvements in stump jump plows and the like, consisting in the combination with an implement frame having a pivoted jump arm or share carrier mounted thereon, draft connections attached to the share carrier, and a swingletree interposed in said draft connections, of a spring controlled releasing device engaging the swingletree and adapted to automatically detach the share carrier from the draft when the draft tension becomes abnormal through a share catching an obstruction.

5. Improvements in stump jump plows and the like, consisting in the combination with an implement frame having pivoted jump arms or share carriers mounted thereon, draft connections for transmitting the draft tension to said share carriers, and a swingletree interposed in said draft connections, of a plurality of independent spring controlled releasing devices connected to the share carriers and adapted to detachably engage the swingletree for the purpose set forth.

6. Improvements in stump jump plows and the like, consisting in the combination of an implement frame having a pivoted jump arm or share carrier mounted thereon and connections for transmitting the draft tension to said share carrier, of a releasing device adapted to automatically free the share carrier from the draft connections when the draft tension exceeds a certain limit through a share catching an obstruction, said releasing device comprising a coupling member having a gullet and an element separable from said coupling member and accommodated by said gullet which is provided with an open mouth through which said separable element is withdrawn from the coupling member, and a spring adapted to normally close said mouth and retain said separable element to the coupling member together for the purpose specified.

7. Improvements in stump jump plows and the like, consisting in the combination of an implement frame having a pivoted jump arm or share carrier mounted thereon and draft connections for transmitting the draft tension to said share carrier, of a releasing device interposed in the draft connections and adapted to free the share carrier from the draft tension when such tension exceeds a certain limit through the share catching an obstruction, said releasing device comprising a coupling member having a gullet, an element separable from said coupling member and accommodated by said gullet which is provided with an open mouth through which said separable element is withdrawn from the coupling member, and a plate spring adapted to normally close said mouth and retain said separable element to the coupling member said spring being pivoted to swing laterally in relation to the coupling member for the purpose specified.

In testimony whereof I affix my signature.

J. H. WARNER.

Witness:
Victor J. Kelson.